UNITED STATES PATENT OFFICE.

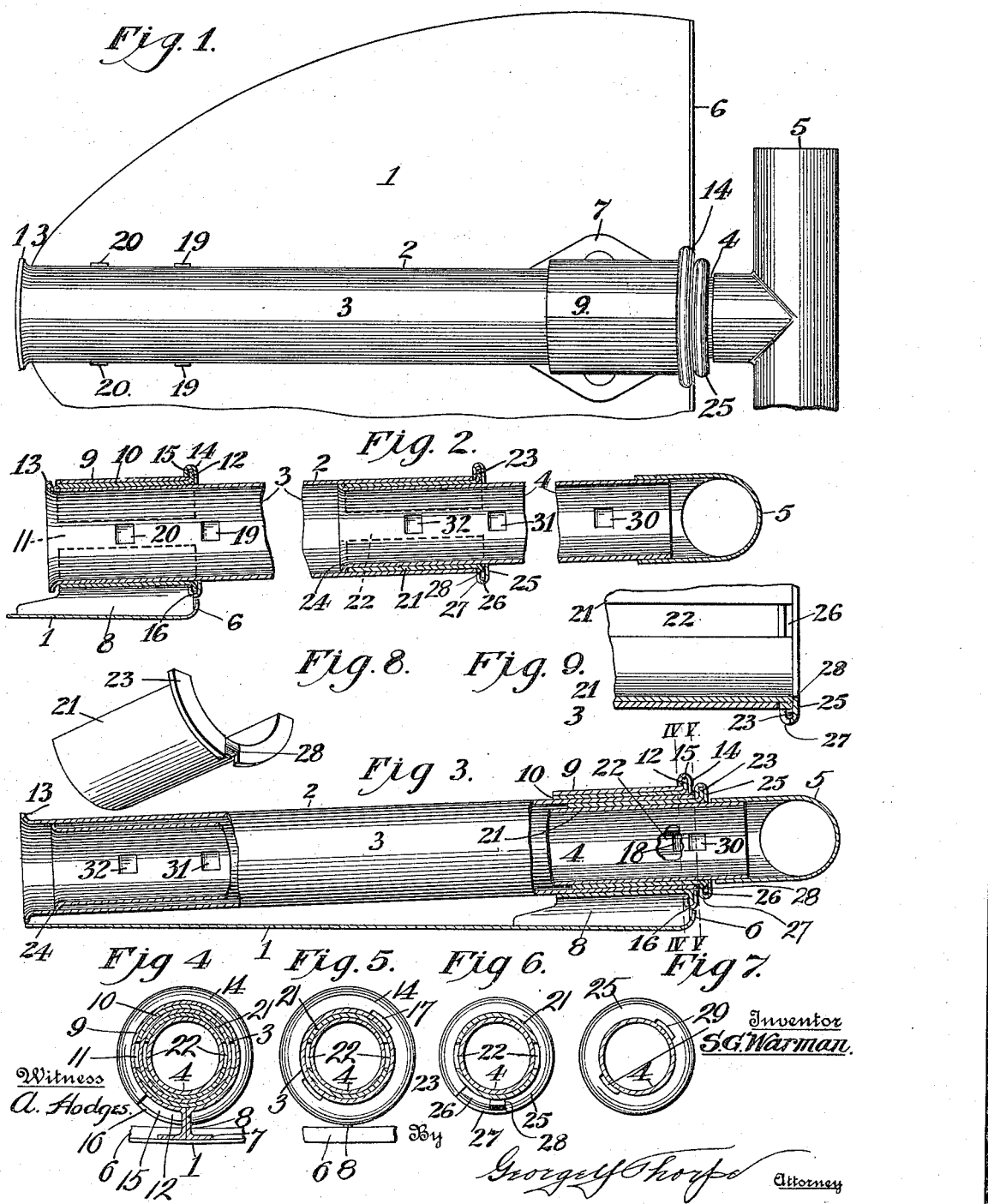

SAMUEL GOSSAGE WARMAN, OF INDEPENDENCE, MISSOURI.

COLLAPSIBLE HANDLE FOR TOOLS.

1,177,073.   Specification of Letters Patent.   Patented Mar. 28, 1916.

Application filed October 18, 1915.   Serial No. 56,597.

*To all whom it may concern:*

Be it known that I, SAMUEL GOSSAGE WARMAN, a citizen of the United States, residing at Independence, in the county of Jackson and State of Missouri, have invented certain new and useful Improvements in Collapsible Handles for Tools, of which the following is a specification.

This invention relates to collapsible handles for tools, such as shovels and the like and has for its object to produce a collapsible handle of simple and improved construction which may be partially collapsed if a short handle is desired, or totally collapsed for storage and transportation.

A further object of the invention is to produce a collapsible handle of telescoping type in which the telescoping sections may be securely connected at various adjustments.

A further object of the invention is to produce a telescoping handle for tools wherein the handle when collapsed will be positioned adjacent to the blade of the tool, so as to occupy but little room and act as a shield or guard to obviate danger of the point of the blade gouging or cutting any object over which it may be drawn or upon which it may fall.

With these and other objects in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being understood, however, that no limitation is necessarily made to the precise structural details therein exhibited, but that changes, alterations and modifications within the scope of the claims may be resorted to when desired.

In the said drawing, Figure 1, is a plan view of a trenching tool equipped with a handle embodying my invention, the blade being broken and the handle shown as collapsed. Fig. 2, is a central vertical section of the same with the handle extended and broken. Fig. 3, is a similar section with the handle collapsed. Fig. 4, is a section on the line IV—IV of Fig. 3. Fig. 5, is a section on the line V—V of Fig. 3, looking forward. Fig. 6, is a section on line V—V of Fig. 3 looking rearward. Fig. 7, is a section of the handle taken just forward of the handle grip, and looking forward. Fig. 8, is a perspective view of one of a pair of reinforcements for the inner telescopic member of the handle. Fig. 9, is an enlarged segmentary section of the reinforcement shown by Fig. 8, and of the telescopic member reinforced thereby and a locking ring for the inner telescopic member, the latter being omitted to clearly disclose a channel otherwise hidden.

Referring to the drawing, in which like parts are correspondingly identified, 1 indicates the blade of a shovel or other tool, and 2 is a collapsible telescopic handle for the tool. When fully extended the handle will preferably be about equal in length to the ordinary rigid handle of a spade or shovel. As shown the handle is composed of two telescopic handle members 3 and 4, though it will be understood that the number of telescopic members may be increased if desired, and secured to the rear end of member 4, which is the inner member, is a cross piece or grip 5.

The blade is provided at its rear edge with an upwardly projecting flange 6, and secured to the blade adjacent the central portion of the said flange is a bracket preferably made from a piece of sheet metal bent to form base flanges 7, an upturned neck 8 and a longitudinally extending sleeve 9, and said sleeve is provided with an internal reinforcement comprising two cylindrical segments 10 arranged in superposed relation preferably and spaced apart so as to provide a pair of longitudinal channels 11, the front end of the reinforcement constituting a forwardly facing shoulder. The sleeve is provided at its rear end with an outturned flange 12, this flange constituting as shown, a part of the reinforcement, which however, may be integrally formed with the sleeve. If the reinforcement comprises separate segments, as illustrated, it is preferred that they shall be soldered or brazed in position, though it is obvious that they may be otherwise secured.

The outer member 3 fits telescopically within the sleeve 9 and at its front end is formed with an outturned flange 13 adapted by contact with the front end of the sleeve or its reinforcement to arrest extending movement of the member 3 with relation to the sleeve 9.

14 is a ring fitting slidingly on the member 3 and provided with an internal groove 15 receiving the flange 12 so that accidental disengagement of the said parts cannot occur, but the ring is capable of turning on the flange. To limit the rotative or turning movement of the ring on the flange, said ring is provided with a slot 16 receiving the rear end of the upstanding neck 8 of the bracket. The ring is also provided near its inner edge with a pair of diametrically opposite notches 17 which may be brought into alinement with channels 11 by rotation around, and in order that such adjustment may be instantly effected the slot 16 is so proportioned and disposed that when one of its ends strikes the neck of the bracket, the said notches 17 will be alined with the channels 11. The outer member 3 is provided with a series or sets of three longitudinally alined external protuberances 18, 19, and 20, each set being disposed in alinement with one of the channels 11.

When the handle is collapsed protuberances 18 engage channels 11 to prevent rotation of the handle, accidental extension of the handle being prevented because the ring 14 at this time is turned to dispose notches 17 out of alinement with protuberances 18, the ring thus serving to lock member 3 in its collapsed position. When the ring is turned to dispose the notches 17 thereof in line with protuberances 18, member 3, will be slid rearward through the sleeve until arrested by contact of flange 13 with the front end of sleeve 9 or its reinforcement, and the parts are so proportioned that as this arrest of member 3, occurs protuberances 19 will be located rearward of ring 15 and protuberances 19 centrally of channels 11 as shown in Fig. 2. Turning of ring 14 will now lock the handle extended by disposing its notches 17 out of alinement with the protuberances 19 and at the same time protuberances 20 in the channels guard against rotative movement of the member 3 of the handle.

The rear end of the member 3 is internally reinforced in the same manner that sleeve 9 is reinforced, that is to say it is provided with superposed cylinder segments 21 spaced apart to provide longitudinal channels 22. The rear end of member 3 is also provided like sleeve 9 with an outwardly projecting flange 23. The front end of member 4 like member 3 is provided with an outwardly projecting flange 24 adapted to limit extending movement of member 4 by abutment against the front end of the reinforcement of member 2, this reinforcement constituting a forwardly facing shoulder. A ring 25 like ring 14 is journaled on member 4 and has an annular groove 26 receiving the flange 23 of member 2, and has a slot 27 corresponding to slot 16 of ring 14, and to limit the rotative or turning movements of ring 25, the flange 23 has a tongue 28 stamped from it and bent back into the slot 27 as shown most clearly in Fig. 9. The rim is provided with notches 29 adapted for alinement with channels 22 and the member 4 is provided with series or sets of external protuberances 30, 31 and 32, the protuberances 30 engaging the channel 22 when the handle is collapsed as shown in Fig. 3, and being held against rearward movement by proper rotative adjustment of ring 25 to dispose the notches 29 thereof out of alinement with the said protuberances.

When the handle is extended protuberances 32 engage the channels 22 as shown by Fig. 2 and protuberances 31 lie rearward of the ring after passing through the notches 29 thereof after which the ring is turned to dispose an imperforate portion thereof in the path of the forward movement of said protuberances 31 for the purpose of locking the handle extended, the engagement of the protuberances 32 with the channels 22 guarding against turning movement of the member 4. When the handle is fully extended, or when member 3 only is extended with respect to its sleeve 9, the tool can be readily manipulated and when the handle is collapsed it can be conveniently carried.

When the handle is collapsed, the protuberances 18 and 30 of members 3 and 4, are respectively engaged with the channels 11 and 22 of sleeve 9 and member 4 and therefore prevent turning movement of said members. The same protuberances also guard against extension of the handle if the rings 14 and 25 are positioned with their notches 17 and 29 out of alinement with the said protuberances. Preliminary to extending the handle half-way, the ring 14 is turned or rotated until arrested through the abutment of one end of slot 16 with the neck 18 of the bracket, when the notches 17 of said ring will be in alinement with the protuberances 18 in channels 11. A pull on the grip 5 will now draw the member 3 forward through sleeve 9, until the flange 13 of said member abuts against the front end of the reinforcements 10 of sleeve 9, at which time it will be seen that protuberances 19 have been drawn through notches 17 and protuberances 20 within the channels 11, the last-named protuberances thus coöperating with the reinforcements 10 in preventing rotation. Reverse rotation of ring 25 now disposes its notches 17 out of alinement with protuberances 19 and thus locks the member 3 in extended position.

If it is desired to increase the length of the handle the ring 25 is rotated until arrested by abutment of one end of its slot 27 against the stop 28 of the reinforcement 21 of member 3, at which time the notches 29 of the ring will be alined with the protuberances 30 of member 4, which can then be withdrawn from member 3, until the flange 24 of the former engages reinforcement 21 of member 3. As this adjustment is attained, it will be found that protuberances 31 have been drawn through notches 29 of ring 25 and protuberances 32 are within the channels 22 and hence lock member 4 against rotation. Ring 25 is now turned to dispose its notches 27 out of alinement with the protuberances 31 and thereby lock the member 4 in its extended position.

With the handle locked against collapse in either its full or half-length position, it will be found perfectly stiff or rigid so that the tool may be used as effectively as a shovel or tool having a non-collapsible or rigid handle. The reversal of the manipulations described will restore the handle to collapsed condition, it being noted that when member 3 is locked in collapsed condition, its protuberances lie within channels 11 just forward of the body of ring 14 and out of alinement with the notches 29 of the latter, the said protuberances coöperating with the internal reinforcement 10 in preventing turning movement of member 3 and with the ring 14 in preventing accidental extension of the handle through movement of member 3. When member 4 is locked in collapsed condition, its protuberances 30 occupy with relation to chambers 22 and ring 25 the same positions as protuberances 18, channels 11 and ring 14.

The parts are preferably so proportioned that when the handle is collapsed, member 3 overlies the point of the blade and serves to shield or guard objects from injury by the point of the blade if the tool should be dropped or be handled carelessly.

From the foregoing it will be apparent that I have produced a collapsible handle for tools and the like which can be produced at low cost and possesses the requisite qualities of strength, rigidity and compactness of construction, it being apparent that it may be modified in some particulars without departing from the scope of the appended claims.

I claim:

1. A collapsible handle for tools, comprising members fitting telescopically, the outer member having a forwardly-facing shoulder and an internal longitudinal channel, and the inner member having an outwardly projecting flange for abutment against said shoulder and a set of three external protuberances for travel in said channel, the foremost and rearmost of said protuberances respectively engaging said channel accordingly as the handle is extended or collapsed, and the intermediate protuberance engaging said channel when the handle is collapsed and lying rearward of the outer member when the handle is extended, and means coöperating respectively with said intermediate and rearmost protuberances to lock the handle in extended or collapsed condition.

2. A collapsible handle for tools, comprising members fitting telescopically, the outer member having a forwardly-facing shoulder and an internal longitudinal channel, and the inner member having an outwardly projecting flange for abutment against said shoulder and a set of three external protuberances for travel in said channel, the foremost and rearmost of said protuberances respectively engaging said channel accordingly as the handle is extended or collapsed, and the intermediate protuberance engaging said channel when the handle is collapsed and lying rearward of the outer member when the handle is extended, and means adjustable to a position behind the rearmost protuberance or in front of the said intermediate protuberance to lock the handle in collapsed or extended condition respectively.

3. A collapsible handle for tools, comprising members fitting telescopically, the outer member having a forwardly facing shoulder, and an internal longitudinal channel, and the inner member having an outwardly projecting flange for abutment against said shoulder and a set of three external protuberances for travel in said channel, the foremost and rearmost of said protuberances respectively engaging said channel accordingly as the handle is extended or collapsed, and the intermediate protuberance engaging said channel when the handle is collapsed and lying rearward of the outer member when the handle is extended, and a ring fitting slidingly upon the inner member and rotatably on the outer member, and provided with a notch through which the rearmost and intermediate protuberances may pass; said ring being rotatable to dispose its imperforate portion in front of the intermediate protuberance to lock the handle extended and behind the rearmost protuberance to lock the handle collapsed.

4. A collapsible handle for tools, comprising members fitting telescopically, the outer member having a forwardly facing shoulder, and an internal longitudinal channel, and the inner member having an outwardly projecting flange for abutment against said shoulder and a set of three external protuberances for travel in said channel, the foremost and rearmost of said protuberances respectively engaging said channel accordingly as the handle is extended or collapsed, and the intermediate protuberance engaging said channel when the handle is collapsed and lying rearward of the outer member when the handle is extended, a ring fitting slidingly upon the inner member and rotatably on the outer member, and provided with a notch through which the rearmost and intermediate protuberances may pass; said ring being rotatable to dispose its imperforate portion in front of the intermediate protuberance to lock the handle extended and behind the rearmost protuberance to lock the handle collapsed, and means fixed with relation to the outer member to limit the rotation of the ring, in one direction when the notch thereof is alined with said protuberances.

5. A collapsible handle for tools, comprising members, fitting telescopically, the outer member having a forwardly facing shoulder, an outwardly projecting flange and an internal longitudinal channel extending from the shoulder to the flange, and the inner member having an outwardly projecting flange and a set of three alined external protuberances for travel in said channel, the foremost and rearmost of said protuberances respectively engaging said channel accordingly as the handle is extended or collapsed, and the intermediate protuberances engaging the said channel when the handle is collapsed and lying rearward of the outer member when the handle is extended, and a ring fitting slidingly on the inner member and rotatably on said flange of the outer member and provided with a notch through which the rearmost and intermediate protuberances may pass and a stop rigid with the outer member for arresting rotative movement of said ring in one direction when the said notch is longitudinally alined with said protuberances and in the reverse direction when said notch is out of alinement with said protuberances.

6. The combination with a tool of a bracket secured to the rear end of the tool midway the width thereof and embodying an upstanding neck and a longitudinally extending sleeve provided with an internal longitudinal channel and an outwardly projecting flange at the rear end of the channel, a tube extending through said sleeve and provided with an outwardly projecting flange at its front end, and three longitudinally alined external protuberances for travel in said channel, the foremost and rearmost of said protuberances respectively engaging said channel accordingly as the tube and sleeve bear an extended or collapsed telescopic relation, and the intermediate protuberance engaging said channel when the said parts are in collapsed relation and lying rearward of the sleeve when the said parts are in extended relation, and a ring fitting slidingly on said tubular member and rotatably on said flange of the sleeve and provided with a notch through which said rearmost and intermediate protuberances may pass, and with a slot extending concentrically of the sleeve and receiving the neck of said bracket, an inner member telescopically fitting the tubular member, means to prevent said inner member turning when extended or collapsed with relation to the tubular member, means to lock the inner member in extended and collapsed condition, and a grip at the rear end of the inner member.

In testimony whereof, I affix my signature.

SAMUEL GOSSAGE WARMAN.

Copies of this patent may be obtained for five cents each, by addressing the "Commissioner of Patents, Washington, D. C."